(12) United States Patent
Steynberg et al.

(10) Patent No.: US 6,673,846 B2
(45) Date of Patent: Jan. 6, 2004

(54) HANDLING OF A CATALYST

(76) Inventors: Andre Peter Steynberg, 4 Moerdyk Street, Sasolburg (ZA); Antonie Christoffel Vosloo, 50 Rembrandt Street, Sasolburg (ZA); Peter Van Berge, 4 Keiskamma Avenue, Baalpark, Sasolburg (ZA)

( * ) Notice: Subject to any disclaimer, the term of this patent is extended or adjusted under 35 U.S.C. 154(b) by 0 days.

(21) Appl. No.: 10/319,333

(22) Filed: Dec. 13, 2002

(65) Prior Publication Data

US 2003/0087971 A1 May 8, 2003

Related U.S. Application Data

(62) Division of application No. 09/687,223, filed on Oct. 13, 2000, now Pat. No. 6,512,017.

(30) Foreign Application Priority Data

Oct. 14, 1999 (ZA) .............................................. 99/6500

(51) Int. Cl.[7] .............................. C07C 27/00; G21C 7/32
(52) U.S. Cl. ........................ 518/728; 518/700; 376/210
(58) Field of Search ................................. 518/728, 700; 376/210

(56) References Cited

U.S. PATENT DOCUMENTS

| 5,733,839 A | 3/1998 | Espinoza et al. |
| 5,866,751 A | 2/1999 | Womack |

*Primary Examiner*—J. Parsa
(74) *Attorney, Agent, or Firm*—Brinks Hofer Gilson & Lione

(57) ABSTRACT

This invention relates to methods of minimizing catalyst degradation during the handling of a catalyst used in a slurry phase reactor. The methods include catalyst handling steps such as catalyst loading into a slurry phase reactor, slurry phase reactor start-up, slurry phase reactor shut-down, and slurry phase reactor unloading when catalyst reloading is envisaged. In the method of loading the slurry phase reactor, a slurry of wax and catalyst is formed in a loading vessel. Clean molten wax is formed in the reactor, syngas is pumped through the clean molten wax in the reactor, and the slurry from the loading vessel is transferred to the reactor.

7 Claims, 2 Drawing Sheets

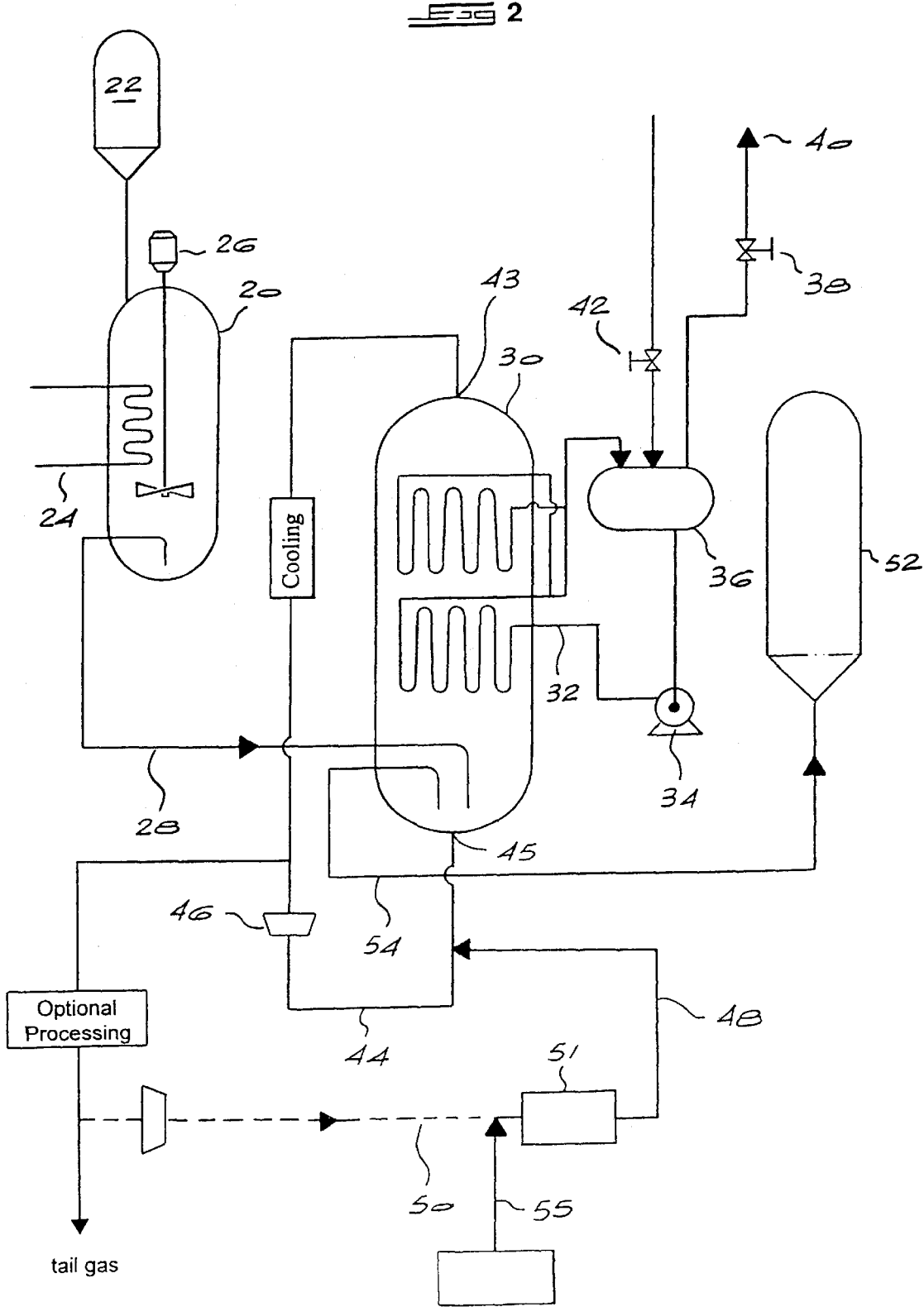

HANDLING OF A CATALYST

This application is a divisional of application Ser. No. 09/687,223, filed on Oct. 13, 2000 now U.S. Pat. No. 6,512,017.

BACKGROUND OF THE INVENTION

This invention relates to methods of minimizing catalyst degradation during the handling of a catalyst used in a slurry phase reactor.

The use of a supported cobalt catalyst in a slurry phase reactor to produce hydrocarbon products from synthesis gas (also known as syngas) which consists mainly of CO and $H_2$, under Fischer-Tropsch conditions, is well known in the art. Syngas may be obtained from natural gas (mainly methane) that is reformed in a steam, partial oxidation or auto-thermal reformer. The syngas is introduced into a slurry phase reactor where it is reacted over a Fisher-Tropsch catalyst to produce hydrocarbon products. The syngas $H_2/CO$ ratio is preferably controlled in a preferred range (typically between 1 and 2) by the recycle of tail gas from the slurry phase reactor or of components derived from this tail gas to a reforming unit.

The Fischer-Tropsch reaction is an exothermic reaction and requires means for heat removal and thermal control. In this regard, it may be noted that the Fischer-Tropsch reaction can be represented by the simplified equation:

$$CO + 2H_2 \rightarrow CH_2 - + H_2O + \text{heat.}$$

Heat removal and control is generally managed by internal cooling pipes in the slurry phase reactor which, in use, are submerged in the slurry phase. Various other reactor internals which serve the purpose of ensuring catalyst suspension and introducing syngas into the reactor are also present.

Due to the nature of the reaction in a slurry phase reactor, the extreme operating conditions and high turbulence within the slurry phase reactor, there are problems with catalyst break-up and catalyst deactivation. The prior art provides various means for rejuvenation or regeneration of deactivated Fischer-Tropsch catalysts, methods of separating hydrocarbon product from catalyst particles and production of stronger catalyst particles to minimize catalyst break-up.

It is also known that catalyst is damaged during storage, transport, catalyst loading, reactor start-up and catalyst unloading from a slurry phase reactor.

It is an object of this invention to address these problems.

SUMMARY OF THE INVENTION

This invention relates to methods of minimizing catalyst degradation in catalyst handling steps such as:
- catalyst loading into a slurry phase reactor;
- slurry phase reactor start-up;
- slurry phase reactor shut-down; and
- slurry phase reactor unloading when catalyst reloading is envisaged.

The Fischer-Tropsch catalyst is protected during transport and storage by coating catalyst particles with a wax wherein the coated catalyst is in the form of discrete wax pieces each containing a plurality of catalyst particles.

The discrete wax pieces are typically in the form of cylindrical blocks.

According to a first aspect of the invention there is provided a method of loading a slurry phase reactor with a catalyst, the method including the steps of:
- forming a slurry of wax and catalyst in a loading vessel;
- introducing clean molten wax into the reactor; and
- transferring a slurry of wax and catalyst from the loading vessel to the reactor.

Advantageously, the slurry in the loading vessel is prepared by adding a wax coated catalyst as described above to the loading vessel and heating the loading vessel to form a slurry of catalyst in molten wax.

Alternatively, the wax coated catalyst may be melted in a separate vessel prior to transfer to the loading vessel.

The loading vessel is preferably pressurized to a pressure of about 2 bar (200 kPa) above that of the pressure of the reactor to which the slurry is to be loaded, so that the slurry from the loading vessel is transferred to the reactor by the difference in pressure and there is no need to use a pump for the transfer. Typically, the loading vessel is pressurized to a pressure of 10–50 atmospheres (1000 kPa-50 kPa), generally about 26 bar (g) (2600 kPa).

Advantageously, the loading vessel is heated to a temperature of greater than 150° C. before the pressure within the vessel is increased to above 1 bar (g) (100 kPa) with a gas containing carbon monoxide.

Prior to introducing the slurry from the loading vessel to the reactor, the reactor preferably contains a clean molten wax and is heated to a temperature above 150° C., typically about 160° C., with syngas being passed through the molten wax.

The reactor may be heated by pumping a heated fluid, such as hot steam or water, through the cooling pipes thereof.

Advantageously, the syngas is recycled through the reactor in an internal recycle system.

Less than 50%, typically less than 25%, of the total quantity of catalyst to be loaded is preferably added to the reactor while syngas is recycled therethrough in the internal recycle system, while the reactor temperature is below the temperature at which the Fischer-Tropsch reaction is initiated.

The catalyst may be added in increments of, for example, about 5,0% until the desired loading of 25% to 50% is reached.

Preferably, the catalyst is added in a wax slurry, as described above, from a loading vessel with the catalyst comprising up to 70% by mass, typically from 40 to 50% by mass, of the slurry.

Advantageously, the temperature within the reactor is maintained below 200° C. until 25% to 50% of the desired catalyst loading is reached, whereafter syngas from an external source is introduced and the temperature of the reactor is increased to about 230° C. Typically, the syngas flow is lower than the normal operating syngas flow while reactor temperature is increased, for example, at 50% of the normal operating syngas flow.

After the temperature of the reactor is increased to 230° C., the syngas flow may be increased, and the rest of the catalyst added. The syngas may now be introduced from an external source, with an $H_2$: CO ratio of below 2:1.

Preferably, the flow rate of the syngas in the internal recycle system is sufficient to fully fluidize the catalyst in the slurry, prior to the introduction of syngas from the external source.

According to a second aspect of the invention there is provided a method of shutting down a slurry phase reactor, including the steps of:
- stopping syngas flow from an external source to the reactor, while continuing to operate an internal recycle system;

cooling the reactor to less than 200° C., but not less than 150° C., while the internal recycle system continues to operate; and transferring slurry from the reactor to an unloading vessel, while continuing to operate the internal recycle system.

Preferably, the unloading vessel is at a lower pressure than the reactor so that the slurry is transferred by the pressure difference, without the need to use a pump.

When the reactor is to be restarted, the slurry may be reloaded into the emptied reactor from the loading vessel and the reactor restarted in the manner described above.

Depending on the activity of the reloaded catalyst it may be desirable to load more catalyst than for the fresh catalyst start-up before initiating the Fischer-Tropsch reaction by increasing the reactor temperature while introducing syngas from an external source. The other features of the fresh catalyst start-up are the same for a start-up using a molten slurry of used catalyst.

According to a third aspect of the invention there is provided a method of dealing with a failure of an external recycle system of a slurry phase reactor, the method including the steps of:

stopping the supply of syngas from the external source;

maintaining an internal recycle system;

lowering the temperature of the reactor to below 200° C.; and unloading at least a portion of the catalyst from the reactor to an unloading vessel.

The reactor may be re-started by:

Starting syngas flow into the reactor and then increasing the temperature of the reactor to about 230° C.; and reloading the unloaded catalyst from the unloading vessel via a loading vessel to the reactor after attaining a stable syngas composition resulting from a stable external recycle gas composition.

According to a fourth aspect of the invention there is provided a method of dealing with failure of an internal recycle system of a slurry phase reactor, the method including the steps of:

stopping syngas flow from an external source to the reactor;

adding a quenching agent to cool the reactor while optionally simultaneously decreasing the pressure in the reactor;

maintaining the temperature in the reactor at not less than 150° C., and not more than 200° C., by controlling the temperature of the water that is pumped through cooling pipes in the reactor; and optionally unloading at least a portion of the catalyst from the reactor to an unloading vessel.

The reactor may be re-started by:

starting the internal recycle system;

if necessary, pressurizing the reactor to the normal operating pressure of between 8 and 48 atmospheres (800–4800 kPa), typically about 24 bar (2400 kPa);

heating the reactor by pumping heated fluid through the cooling pipes of the reactor;

introducing syngas from an external source when the catalyst in the reactor is fluidized by the internal recycle system and then increasing the temperature of the reactor to about 230° C.; and if necessary, reloading the unloaded catalyst from the unloading vessel via a loading vessel to the reactor after attaining a stable syngas composition from the external syngas source.

BRIEF DESCRIPTION OF THE DRAWINGS

FIG. 2 is a flow diagram of slurry reactor and loading and unloading apparatus according to the invention.

DETAILED DESCRIPTION OF PREFERRED EMBODIMENTS

Figure 1:
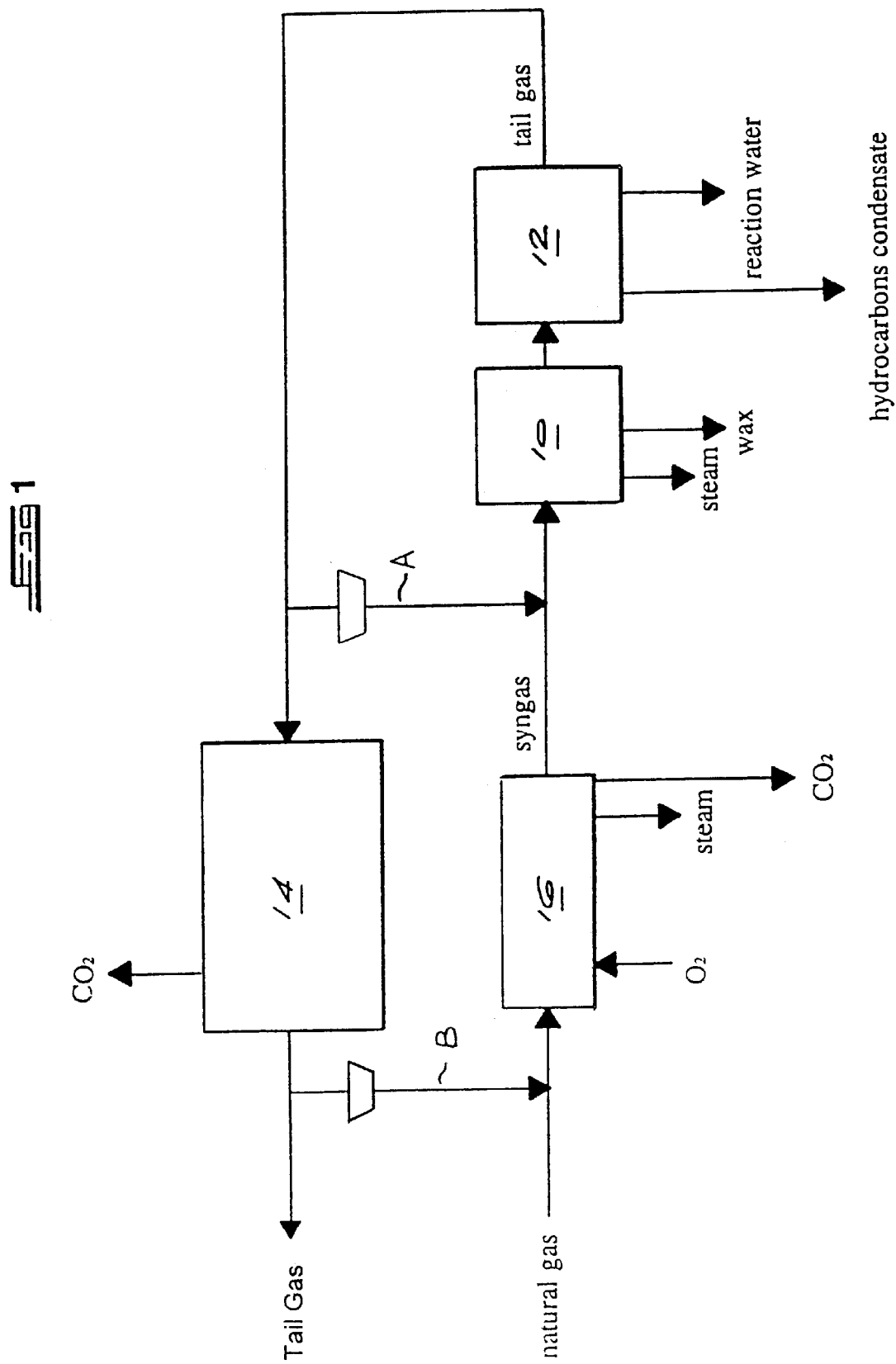
FIG. 1 is a flow diagram of a typical Fischer-Tropsch system.

Referring to FIG. 1, a typical slurry phase reactor system for a Fischer-Tropsch conversion process comprises a slurry phase reactor 10 a cooling and separation unit 12, optionally a second separation unit 14 and an auto-thermal reformer unit 16 with associated heating, cooling and separation. In use, natural gas which is mainly methane is treated in the auto-thermal reformer unit 16 to form synthesis gas (syngas). The syngas is formed through the addition of oxygen and process steam with utility steam produced as a byproduct of associated cooling. After further cooling and separation of condensed water containing some dissolved gasses and optional removal of carbon dioxide, the syngas produced is reacted with a Fischer-Tropsch catalyst in the slurry phase reactor 10 to form hydrocarbon products. The heavier hydrocarbon products (reactor wax) are separated from the catalyst in the reactor typically by filtration. The lighter hydrocarbon products exit the reactor in the vapour phase and are cooled, separated and "captured" as a hydrocarbon condensate in the cooling and separation unit 12. Tail gas from the cooling and separation unit 12 then follows an internal recycle path "A" wherein the tail gas is typically mixed with syngas, heated and recycled into the slurry phase reactor 10.

Tail gas also follows in an external recycle path "B" wherein the tail gas may pass through the separator 14 where there is optional partial removal of $CO_2$. Thereafter the tail gas, or components obtained from the tail gas is mixed with the other feed gasses, heated and passed through the auto-thermal reformer 16 (or an adiabatic pre-reformer) and is returned with newly formed syngas to the slurry phase reactor 10. External recycle gas consisting of tail gas or components derived from the tail gas is used to control the $H_2/CO$ ratio of the syngas, keeping it below 2.0.

It is preferred that the slurry phase reactor 10 is operated for several years, with as few interruptions as possible, to ensure steady activity and to minimize degradation of the catalyst. In this type of system the preferred catalyst is a supported cobalt catalyst which typically does not require any on-line regeneration or rejuvenation and is not replaced for a number of years.

There are times however, when the reactor is shut down, for example during maintenance or during break-downs.

Slurry Reactor Start-up

Due to the long life of the catalyst and relatively large quantities required, the catalyst is usually prepared at a separate location to the slurry phase reactor and stored for relatively long periods before it is used in the reactor.

In order to protect the catalyst from oxidation during storage and transportation, it is coated with a solid wax, for example SASOL Paraflint™ H1 hydrogenated hard wax. The coated catalyst is prepared by melting the wax and adding the catalyst in an inert gas environment (i.e. free of oxygen) and allowing the catalyst wax mixture to cool and harden. The catalyst wax mixture is preferably formed into discrete pieces of solid wax each containing particles of catalyst, which are convenient to handle. The solid wax particles are preferably in the form of cylindrical blocks which are stored in drums. The wax particles protect the catalyst within from oxidation.

Referring to FIG. 2, a wax slurry containing catalyst particles is introduced into a Fischer-Tropsch reactor 30 via a loading vessel 20. Coated catalyst wax pieces (not shown) are added to the loading vessel 20 via a size reduction device for example a rotary crusher, a lock hopper or small scale melting vessel 22. The loading vessel 20 is a pressure vessel containing heating pipes 24 and a mixer 26. The heating medium within the heating pipes 24 is steam at a pressure of about 12 bar (g) (1200 kPa). The loading vessel 20 is pressurized with a gas that is practically free of sulphur or any oxidizing gas such as oxygen or water vapour. A convenient gas to use is compressed syngas or tail gas from a slurry phase reactor. The loading vessel 20 is heated, by the heating pipes 24, to a temperature above 150° C. before the pressure is increased to above 1 bar (g) (100 kPa), to avoid the formation of cobalt carbonyl when a cobalt catalyst is used. After the catalyst/wax slurry is heated above 150° C., the pressure in the loading vessel 20 is increased to about 2 bar (200 kPa) above the pressure in the slurry phase reactor 30, generally to a pressure of about 26 bar (g) (2600 k Pa).

The loading vessel 20 is arranged to load the slurry of molten wax and catalyst via a pipe 28 into the slurry phase reactor 30.

Before adding the wax and catalyst to the slurry phase reactor 30, a clean wax (i.e. a wax containing little or no catalyst) is introduced into the reactor 30. The amount of clean wax added is sufficient to submerge the internal components of the reactor 30, once molten. The clean wax is then heated in the reactor to a temperature of above 150° C., typically about 160° C. A slurry phase reactor 30 contains pipes 32, typically at more than one elevation, that are normally used for cooling the reactor. According to the invention, these same pipes are used in the start-up procedure to heat the reactor to a temperature above 150° C. The pipes 32 are heated with steam from a high pressure steam header 34 that is at sufficient pressure to maintain a temperature in a steam drum 36 connected to the pipe 32, above 210° C. and preferably above 230° C. During normal operation the steam is passed in a two-phase flow through the pipes 32 into the steam drum 36 where further water vapour is flashed off and the resulting steam is discharged through a pressure control valve 38 into a medium pressure steam header 40. The steam header 40 may operate at any pressure between about 6 and 16 atmospheres (600 and 1600 kPa) but the pressure is typically about 12 bar (g) (1200 kPa). During the heating mode the steam drum pressure control valve to this medium pressure steam header 40 is closed and pressure within the steam drum 36 is controlled by a separate control valve 42 that introduces steam from a high pressure steam source via a conduit and optionally a sparger (submerged in the water phase in the steam drum).

The reactor 30 is connected to an internal recycle system 44 (shown by a continuous line) which is driven by a compressor 46. The internal recycle system 44 exits the reactor 30 at a reactor outlet 43 and enters the reactor 30 at a reactor inlet 45. The reactor 30 and internal recycle system 44 are charged with syngas which is recycled via the internal recycle system 44 through the molten wax in the reactor 30.

Once the slurry phase reactor has reached a temperature of 160° C. and a pressure which will depend on the capabilities of the recycle compressor, but which is below the normal operating pressure of about 24 bar (g) (2400 kPa), with the recycled syngas being introduced via the internal recycle system 44 at a flow rate of at least 5 cm/s, wax slurry containing catalyst from the loading vessel 20 is transferred to the reactor 30. Because the pressure in the loading vessel 20 is higher than the pressure in the reactor 30, the slurry containing the catalyst is transferred to the reactor without the need to use a pump.

The quantity of catalyst introduced into the reactor 30, while the reactor is connected only to the internal recycle system 44 only, is less than the total quantity to be loaded for normal operation. Less than 50%, typically 25% of the normal catalyst inventory is introduced. The catalyst content of the slurry transferred from the loading vessel 20 may be up to 70% by mass but is typically between 40 and 50% by mass of the slurry composition.

The catalyst to be introduced while the internal recycle system 44 only is running, may be introduced all at once, or it may be introduced incrementally. For example where 25% of the total amount of catalyst to be loaded is introduced, catalyst may be introduced in two separate steps of 12.5% catalyst or five separate steps of 5%. After 25% of the catalyst is introduced, and ensuring that the reactor internals are submerged in molten wax, the temperature within the reactor 30 is brought up to about 200° C., at which temperature the Fischer Tropsch reaction is initiated The temperature of the slurry within the reactor 30 is controlled by manipulating the temperature of the water through the pipes 32, bearing in mind that a Fischer-Tropsch reaction that generates heat will have already started. The reactor 30 is then connected to an external source of syngas 48, and an external tail gas recycle system (shown in a dotted line) 50 which includes a reformer unit 51. The reformer unit 51 is supplied with natural gas 55 which, together with gas from the external recycle system 50, is formed into the syngas 48. The temperature of the reactor 30 is brought up to the normal operating temperature of 230° C. After establishing the normal operating temperature of 230° C. it becomes possible to set the external recycle flow 50 to control the syngas H2/CO ratio to the normal operating range between 1.90 and 1.95. The remainder of the catalyst is then added from the loading vessel at full Fischer Tropsch reactor operating conditions.

In the above start-up procedure it is preferable to maintain the temperature of the slurry within the reactor 30 to below 200° C. until the external recycle loop 50 has been established, whereafter the temperature is gradually increased to the 230° C. normal operating value. Typically, the gas loop composition is allowed to stabilize after each 5° C. increase in reactor operating temperature and the syngas flow is at 50% to 70% of the normal operating rate.

The reasons for the abovementioned method are as follows:

Clean wax is introduced into the reactor before introducing the catalyst to avoid significant periods during which the catalyst is contacted with carbon monoxide within the reactor at temperatures below 150° C. which could lead to the formation of cobalt carbonyls.

When new catalyst is introduced into a reactor it has a much higher initial activity than the eventual stable activity that is maintained for several years. The catalyst may be damaged if any of the following events occur:

a) the partial pressure of water in the reactor exceeds about 5 bar (500 kPa);
  b) the partial pressure of carbon monoxide decreases to below 0.5 bar (50 kPa); or
  c) the temperature of the catalyst slurry exceeds 240° C.

During normal operation the syngas $H_2$/CO ratio is controlled by adjusting the flow rate of tail gas recycle to the auto-thermal reformer (external recycle).

With the external recycle system operating during normal operation, it is not possible to exceed the constraints in a) and b), even at 100% of the conversion of hydrogen entering the Fischer-Tropsch in the syngas. This is due to $H_2/CO$ ratio being below the stoicheometric consumption ratio so that the CO remaining cannot decrease to a partial pressure below 0.5 bar (50 kPa) from constraint b). The procedures described previously are required to avoid constraints a), b) and c) during the start-up before a stable syngas composition is attained.

For constraint a) it may be noted that gas from the reactor outlet 43 is cooled to typically about 40° C. to condense water vapour before it is recycled as internal recycle to the reactor feed conduit. The dry recycle gas flow can therefore be set to avoid exceeding the water partial pressure constraint. A further requirement for the recycled gas flow is that it should be sufficient to fully fluidize the catalyst in the absence of syngas. As a result of reaction with syngas any zones of stagnant catalyst can cause local high temperatures exceeding 240° C. It has been found that the minimum velocity needed to fluidize all the catalyst may be as high as about 15 cm/s for a slurry phase reactor containing supported cobalt catalyst with a maximum particle size of 200 microns. Thus, the catalyst is fully fluidized with recycled gas prior to the introduction of syngas.

Failure of the Internal Recycle System

In the event of failure of the internal recycle system 44 all gas flow to the reactor 30 is stopped. A liquid paraffin quench is added to the reactor 30 to cool the reactor while optionally simultaneously decreasing the pressure to about 7 bar (700 kPa) in about 15 minutes in order to prevent catalyst damage. The reactor 30 is maintained at a temperature of about 160° C. by pumping hot water through the pipes 32. When the internal recycle system 44 has been repaired, the reactor is pressurised if necessary to the normal operating pressure, the internal recycle system 44 is started up and depending on the catalyst activity it may be required to unload a portion of the catalyst and to add wax to maintain the catalyst level. Thereafter, the external recycle system 50 is brought into operation. The reactor 30 is then heated by pumping steam through the pipes 32 until it reaches a temperature of about 200° C. Syngas 48 from the external source is then again added to the system and the reactor temperature is increased to 230° C. The unloaded catalyst is returned to the reactor when the gas composition is stable. The reactor then continues to function as normal.

Failure of the External Recycle System

In the event of failure of the external recycle system 50 only the flow of syngas 48 and the external system 50 is stopped. The internal recycle system 44 is maintained and the temperature of the reactor 30 is decreased to below 200° C. Depending on the activity of the catalyst at the time of failure, it may be necessary to unload some of the catalyst. When the external recycle system has been repaired, the syngas 48 and external recycle system 50 are brought back into normal operation and the reactor temperature is then increased to 230° C. When the gas composition is stable, the unloaded catalyst may be returned to the reactor.

Planned Reactor Shutdown

A planned reactor shutdown procedure involves first stopping the syngas flow 48 and the external recycle system 50, while continuing to operate the internal recycle system 44. The reactor 30 is cooled to below 200° C. (but never below 150° C. in order to avoid the formation of cobalt carbonyl). The internal recycle system is kept in operation to suspend the solids in the slurry and the slurry is unloaded into an unloading vessel 52 via a dip pipe 54 that is situated near the bottom of the reactor 30. The unloading vessel 52 is of a lower pressure than the pressure in the reactor 30 and the slurry is conveniently transferred from the reactor 30 to the unloading vessel 52 by way of a pressure difference between the vessels without the need to use a pump. When practically all of the slurry has been unloaded from the reactor 30 the internal recycle system 44 is stopped, the pressure within the reactor 30 decreased, and the reactor is now prepared for inspection and maintenance.

If the catalyst is to be reused, the unloaded slurry may be transferred from the unloading vessel 52 into heated vessels under an atmosphere that is free from oxygen and carbon monoxide and are kept at a temperature of more than about 120° C. so that the wax remains molten with an acceptable viscosity for subsequent transfer.

The reactor 30 is reloaded in the same way as the slurry reactor start-up. A clean wax is first introduced into the reactor 30 to form molten wax. 25% to 50% of the unloaded catalyst is then added incrementally from a loading vessel 20 with only the internal recycle system 44 in operation and the temperature below 200° C. Once the reactor 30 is fluidized, the pressure is increased to the normal operating pressure of typically about 24 bar(g) (2400 kPa) and temperature to 230° C., the rest of the unloaded slurry is reloaded into the reactor 30 and the reactor 30 operates as normal.

The following Example shows a start-up procedure for loading a slurry phase reactor, and is not to be construed to limit the scope of the invention in any way.

EXAMPLE

Conditions prior to start-up of the Fischer-Tropsch slurry phase reactor are as follows:

a) Autothermal reformer operating with 0.6 steam to reformable carbon ratio with recycle of syngas to the reformer inlet to achieve a syngas $H_2/CO$ ratio of less than 2.2.

b) Autothermal reformer typically operating at 30% to 70% of design capacity.

c) The slurry phase reactor is pressurised to the normal operating pressure with this syngas and the recycle compressor is started.

d) Wax may be transferred to the reactor at the same time or subsequent to step (c) to establish the minimum operating level required to submerge all the reactor internals.

e) The solid catalyst/wax particles are loaded into the melting and loading vessel via the lock hopper and this molten slurry is heated to above 150° C. and then prepared for transfer to the reactor by increasing the pressure in the melting and loading vessel to approximately 2 bar (200 kPa) above the pressure in the reactor using external recycle gas.

f) The water in the steam drum is heated to approximately 260° C. by introducing high pressure steam and this hot water is circulated through the pipes in the reactor to heat the wax to a temperature of about 200° C.

The reactor start-up then proceeds as follows:

a) Transfer catalyst/wax slurry (12.5% of the total catalyst inventory) to the reactor.

b) Melt the next 12.5% of the wax coated catalyst while simultaneously removing wax from the reactor by filtration to decrease the level to the minimum operating level.

c) Transfer the catalyst/wax slurry to the reactor.

d) Allow the reactor temperature to increase to above 200° C. and then shut the high pressure steam and decrease the steam drum pressure by venting steam to the medium pressure steam header. This decreases the temperature of the water to below the temperature of the slurry inside the reactor. Heat is thus removed from the reactor as the exothermic Fischer-Tropsch reaction proceeds in order to control the slurry temperature. The temperature control set point is gradually increased (say 5° C. every 30 minutes) in order to increase the reactor temperature from 200° C. to the 230° C. normal operating temperature.

e) During the temperature increase period the Tail Gas composition and hence the external recycle composition changes. After establishing the normal operating temperature it becomes possible to set the external recycle flow to control the syngas $H_2/CO$ ratio in the normal operating range between 1.90 and 1.95.

f) The syngas flow can be increased to the full design flow after establishing the target syngas composition.

g) The remainder of the catalyst can be added at the full reactor operating conditions since the internal and external recycle ratios and syngas $H_2/CO$ ratio can be set so that even if 100% hydrogen conversion is attained the CO partial pressure will be above 0.5 bar (50 kPa) and the $H_2O$ partial pressure will be below 5 bar (500 kPa). A typical internal recycle gas to syngas ratio is between 0.8:1 and 1.2:1. A typical external recycle to natural gas ratio is between 0.2:1 and 0.4:1.

What is claimed is:

1. A method of shutting down a slurry phase reactor, including the steps of:

stopping synthesis gas flow, from an external source, to the reactor, while continuing to operate an internal recycle system comprising recycling gas from an outlet of the reactor to an inlet of the reactor;

cooling the reactor to less than 200° C., but not less than 150° C., while the internal recycle system continues to operate; and transferring slurry from the reactor to an unloading vessel, while continuing to operate the internal recycle system.

2. A method according to claim 1 wherein the unloading vessel is at a lower pressure than the reactor so that the pressure in the reactor causes the slurry to flow from the reactor to the unloading vessel without the need of a pump.

3. A method of dealing with a failure of an external recycle system of a slurry phase reactor, the method including the steps of:

stopping the supply of synthesis gas, from an external source, to the reactor;

maintaining an internal recycle system comprising recycling gas from an outlet of the reactor to an inlet of the reactor;

lowering the temperature of the reactor to below 200° C., but to not less than 150° C.; and unloading at least a portion of the catalyst from the reactor to an unloading vessel.

4. A method according to claim 3 wherein the reactor is re-started by:

starting synthesis gas flow into the reactor and then increasing the temperature of the reactor to about 230° C.; and reloading the unloaded catalyst from the unloading vessel via a loading vessel to the reactor after attaining a stable synthesis gas composition resulting from a stable external recycle gas composition.

5. A method of dealing with failure of a slurry phase reactor internal recycle system comprising recycling gas from an outlet of the reactor to an inlet of the reactor, the method including the steps of:

stopping gas flow to the reactor;

adding a quenching agent to cool the reactor while optionally simultaneously decreasing the pressure in the reactor; and maintaining the temperature in the reactor at not less than 150° C., and not more than 200° C., by controlling the temperature of the water that is pumped through cooling pipes in the reactor.

6. A method according to claim 5 wherein the reactor is re-started by:

recycling gas from the reactor outlet to the reactor inlet, thereby starting the internal recycle system;

ensuring that the reactor is at its normal operating pressure of between 8 and 48 atmospheres (800–4800 kPa);

heating the reactor by pumping heated fluid through the cooling pipes of the reactor; and introducing synthesis gas from an external source when the catalyst in the reactor is fluidized by the internal recycle system and then increasing the temperature of the reactor to about 230° C.

7. A method according to claim 6, which includes unloading at least a portion of the catalyst from the reactor to an unloading vessel while the temperature in the reactor is maintained at said temperature of not less than 150° C. and not more than 200° C., and then, after the synthesis gas from the external source has been introduced and the temperature of the reactor increased to about 230° C., reloading the unloaded catalyst from the unloading vessel via a loading vessel to the reactor after attaining a stable synthesis gas composition from the external source.

* * * * *